US005627905A

United States Patent [19]
Sebok et al.

[11] Patent Number: 5,627,905
[45] Date of Patent: May 6, 1997

[54] OPTICAL FLOW DETECTION SYSTEM

[75] Inventors: Thomas J. Sebok; Dale R. Sebok, both of Tallmadge, Ohio

[73] Assignee: Lockheed Martin Tactical Defense Systems, Akron, Ohio

[21] Appl. No.: 353,589

[22] Filed: Dec. 12, 1994

[51] Int. Cl.$^6$ .................................. G06K 9/00; H04N 5/16
[52] U.S. Cl. ..................... 382/107; 382/103; 348/416; 348/699
[58] Field of Search ..................... 382/103, 107; 364/516, 174; 348/169, 416, 699, 155, 208

[56] References Cited

U.S. PATENT DOCUMENTS

| | | | |
|---|---|---|---|
| 5,034,986 | 7/1991 | Karmann et al. | 382/107 |
| 5,067,014 | 11/1991 | Bergen et al. | 382/107 |
| 5,265,172 | 11/1993 | Markandey et al. | 382/107 |
| 5,323,470 | 6/1994 | Kara et al. | 382/107 |
| 5,365,603 | 11/1994 | Karmann | 382/103 |
| 5,500,904 | 3/1996 | Markandey et al. | 382/103 |

OTHER PUBLICATIONS

Maybank, S.J., "A Second Look at the Least–Squares Algorithm for Recovering Information from Optical Flow", pp. 1–4, 1988.

Li, Haibo, "Global Interpretation of Optical Flow Field: A Least Square Approach", IEEE, pp. 668–671, 1992.

Micheli, Enrizhu, "The Accuracy of the Computation of Optical Flow and of the Recovery of Motion Parameters", IEEE, pp. 434–447, 1993.

*Primary Examiner*—Andrew Johns
*Assistant Examiner*—Matthew C. Bella
*Attorney, Agent, or Firm*—Renner, Kenner, Greive, Bobak, Taylor & Weber

[57] ABSTRACT

An optical flow detection system is employed in conjunction with a target cuer system, which includes a sensor carried on a platform, for the purpose of either removing undesirable sensor motion or for the purpose of removing undesirable background motion so that targets may be more easily identified. The optical flow detection system includes an optical flow estimator which receives a plurality of pixels and generates therefrom an instantaneous pixel velocity value and a predicted pixel velocity value. The instantaneous pixel velocity values and predicted pixel velocity values are then manipulated to remove undesirable features included in the image sequence generated by the sensor. Methods for operating the optical flow detection system are also provided.

19 Claims, 3 Drawing Sheets

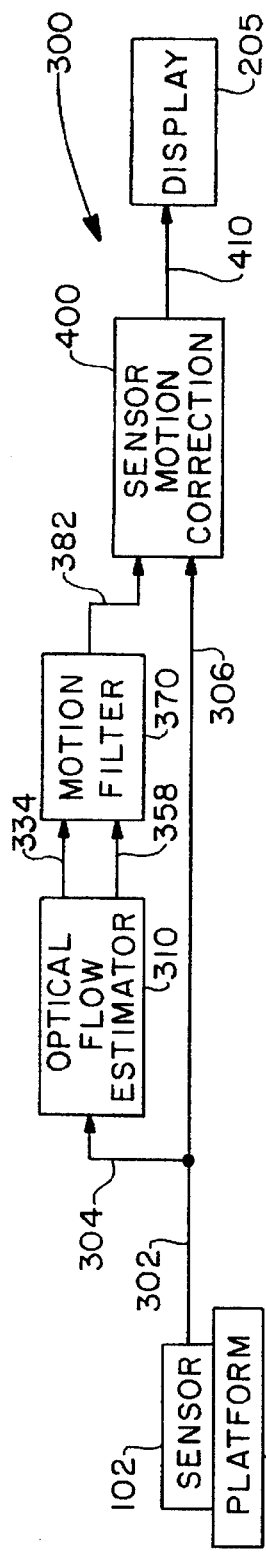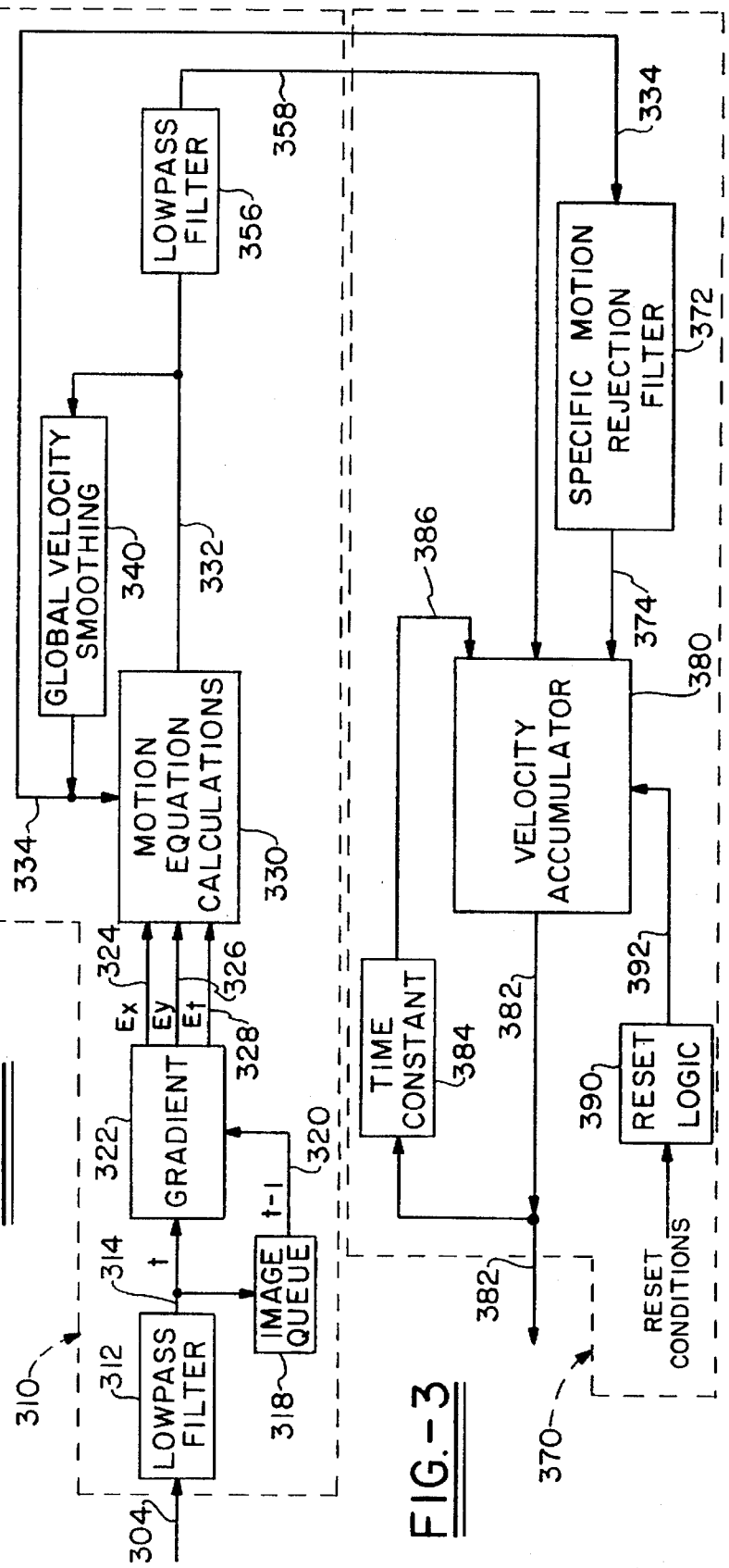

OPTICAL FLOW DETECTION SYSTEM

TECHNICAL FIELD

The invention herein resides in the art of simultaneously tracking multiple moving targets and removing undesirable sensor motion. More particularly, the invention relates to tracking multiple moving targets by an observation device that is itself capable of moving in all six degrees of motion. Specifically, the present invention relates to a video-based real time device which employs optical flow techniques that incorporate quadratic equations for electronically monitoring pixel movement for the purpose of filtering the pixel movement belonging to the movement of the observation device and for the purpose of tracking pixel movement belonging to the movement of objects.

BACKGROUND ART

It is known that operators of video-based missile targeting or imaging systems require the assistance of an automatic target cuer for quickly locating moving targets. This task is especially difficult when the targeting device is also traveling at a high rate of speed. As such, video-based missile targeting or imaging systems require a steady image sequence, which is only obtainable from a reliable platform. Typically, these platforms, such as ships, planes, armored vehicles and the like, require the use of inertial stabilized gimbaling systems which tend to be bulky and expensive. A steady image sequence is important when one considers that an object to be tracked, such as an adversarial missile, makes up just one pixel out of a 256×256 pixel array and is very difficult to observe. This difficulty in object tracking is especially true when a missile blends in with the background scene motion.

Current target cuer-systems or object tracking systems analyze each video image display, frame by frame. All objects within each frame are segmented based on their contrast level. In other words, characteristics such as brightness and density are compared between successive frames of video. Subsequently, each frame of video is validated, with the validated resolution processed by the tracking system. However, because these moving objects are ultimately tracked by comparing static frames of video, any movement at the pixel level is not considered by the tracking system. Therefore, current cuer systems have difficulty in tracking camouflaged targets, small targets, and targets that have a low signal to noise ratio because they lack the required contrast.

To overcome the difficulty of tracking targets that are camouflaged, small or have a low signal to noise ratio, motion detection enhancements can be added to the tracking system. Motion detection enhancements supplement conventional intensity based cuer systems by employing pixel motion data. In other words, if an object within a video display is moving at a rate of speed different than the remaining objects within a video display, the pixels assigned to that moving object are identifiable.

It will be appreciated that in a video-based system, a sensor, typically a high-speed camera, is moveable in a variety of directions, including but not limited to zoom, roll, pan, along-track translation, and cross translation. In addition to the aforementioned sensor movements, the pitch of the sensor causes non-uniform pixel motion, sometimes called keystoning, in the video display. Keystoning occurs when the outer portions of the video display move faster than the inner portions. As such, motion detection systems must compensate and remove these adverse keystoning effects and other undesired sensor movements. It has been found that the use of correlation techniques to compensate for this complex scene motion with the required accuracy to allow scene stabilization is not practical. Correlation techniques fail because only large groups of pixels are compared to one another. As such, motion of the individual pixels within the group of pixels is not detectable, especially in high clutter or camouflaged areas of view. However, it has been found that optical flow techniques can estimate individual pixel velocities with sufficient accuracy to allow for compensation when the sensor is viewing a scene containing complex scene motion.

Optical flow estimation allows estimation of background motion and irregular object motion so that undesired motion can be removed from the input image by "warping" the pixels on a sub-pixel level. In other words, the velocity movement or "optical flow" of each pixel is observed and processed at a sub-pixel level. This optical flow information is used to remove platform motion and to compare two video images in time to one another. All optical flow determinations require that a velocity continuity constraint equation be used.

Known methods of determining optical flow include employing a low pass filter to constrain the instantaneous velocity of each individual pixel, or employing a set of linear equations to fit the instantaneous pixel velocity data. Unfortunately, a low pass filter only considers spatially local pixel velocities and does not have the capability to consider the overall or global pixel velocity field. As such, tracking multiple objects by use of a low pass filter cannot respond to rapidly changing platform motion. Consequently, an optical flow system employing only a low pass filter does not have the desired sensitivity. Determining optical flow by employing linear equations to fit the instantaneous pixel velocity data does not properly consider sensor motion in the second degree. In other words, any curvilinear motion of the sensor is not considered in the optical flow determination. As such, the predicted motion represented by a linear equation includes inherent displacement errors because of the curvilinear motion of the background pixel motion.

Therefore, to overcome the aforementioned shortcomings in using an optical flow technique, there is a need in the art for an optical flow detection system which employs a more precise method of evaluating and filtering the instantaneous pixel velocity data. A device to meet this need is required to positively identify multiple threatening targets by using multiple frames of video imagery to estimate the velocity of each and every pixel image. Additionally, a device to meet this need is required to compensate for irregular platform motion.

DISCLOSURE OF INVENTION

In light of the foregoing, it is a first aspect of the invention to provide an optical flow detection system that quickly locates and identifies moving targets.

Another aspect of the invention is to provide an optical flow detection system that utilizes a video display for detecting multiple moving targets.

Still a further aspect of the invention is to provide an optical flow detection system in conjunction with an automatic target cuer which detects multiple moving targets and electronically enhances their appearance on a video display so as to facilitate detection of the target against a cluttered background.

An additional aspect of the invention is to provide an optical flow detection system that reduces the possibility of false target detections in highly cluttered background scenes.

Yet another aspect of the invention is to provide an optical flow detection system with an optical flow technique that utilizes instantaneous pixel velocity data received by a sensor and inputs this data into a set of quadratic equations which generate an output that indicates which pixels of the video display are to be enhanced for easier detection thereof.

A further aspect of the present invention is to provide an optical flow detection system that is capable of detecting object motion in all six degrees of motion.

Still a further aspect of the present invention is to provide an optical flow detection system adaptable to a variety of platforms which carry a sensor.

Still a further aspect of the present invention is to provide an optical flow detection system that depending on the platform employed, can eliminate one or more undesirable types of sensor motion to stabilize the field of view provided by the sensor.

An additional aspect of the present invention is to provide an optical flow detection system that compensates and removes unwanted background motion in all six degrees of platform motion.

Yet another aspect of the invention is to provide an optical flow detection system with an optical flow technique that utilizes instantaneous pixel velocity data received by a sensor and inputs this data into a set of quadratic equations which generate an output that can be easily modified to remove undesirable sensor motion related to motion of a platform on which the sensor is mounted.

A further aspect of the present invention is to provide an optical flow detection system which has a plurality of programmable gate arrays that are accessible by Programmable Read Only Memory (PROM) devices for the purpose of adjusting the optical flow technique as required by the system hardware.

The foregoing and other aspects of the invention which shall become apparent as the detailed description proceeds are achieved by an optical flow detection system for receiving a plurality of pixels so as to derive an instantaneous pixel velocity value and a predicted pixel velocity value for each pixel, comprising: a sensor for supplying an imaging sequence, which includes potential targets, represented by at least one pixel; an image queue for storing the imaging sequence; a gradient operation for receiving and comparing the imaging sequence to the stored imaging sequence so as to generate a pixel intensity gradient value for each of the pixels; a calculator for receiving the pixel gradient intensity values and a predicted pixel velocity value so as to generate an instantaneous pixel velocity value for each pixel; and a smoothing device for receiving the instantaneous pixel velocity values such that the predicted pixel velocity values are generated therefrom.

The present invention further includes a method for estimating the optical flow of a plurality of pixels by employing a set of quadratic equations to generate a plurality of instantaneous pixel velocity values and a plurality of predicted pixel velocity values for each pixel, comprising the steps of: providing a sensor to supply a real time imaging sequence represented by a plurality of pixels; storing the imaging sequence in an image queue; comparing the stored imaging sequence to the imaging sequence so as to generate an intensity value for each of the pixels; calculating an instantaneous pixel velocity for each pixel derived from the pixel intensity values and a predicted pixel velocity value by employing a set of quadratic equations; and smoothing the instantaneous pixel velocity values so as to generate the predicted pixel velocity values.

BRIEF DESCRIPTION OF DRAWINGS

FIG. 2 is a flow chart of the operation of an embodiment of the present invention employing an optical flow technique for stabilizing a video image;

FIG. 3 is a flow chart of an optical flow estimation procedure of the present invention;

BEST MODE FOR CARRYING OUT THE INVENTION

Figure 1:
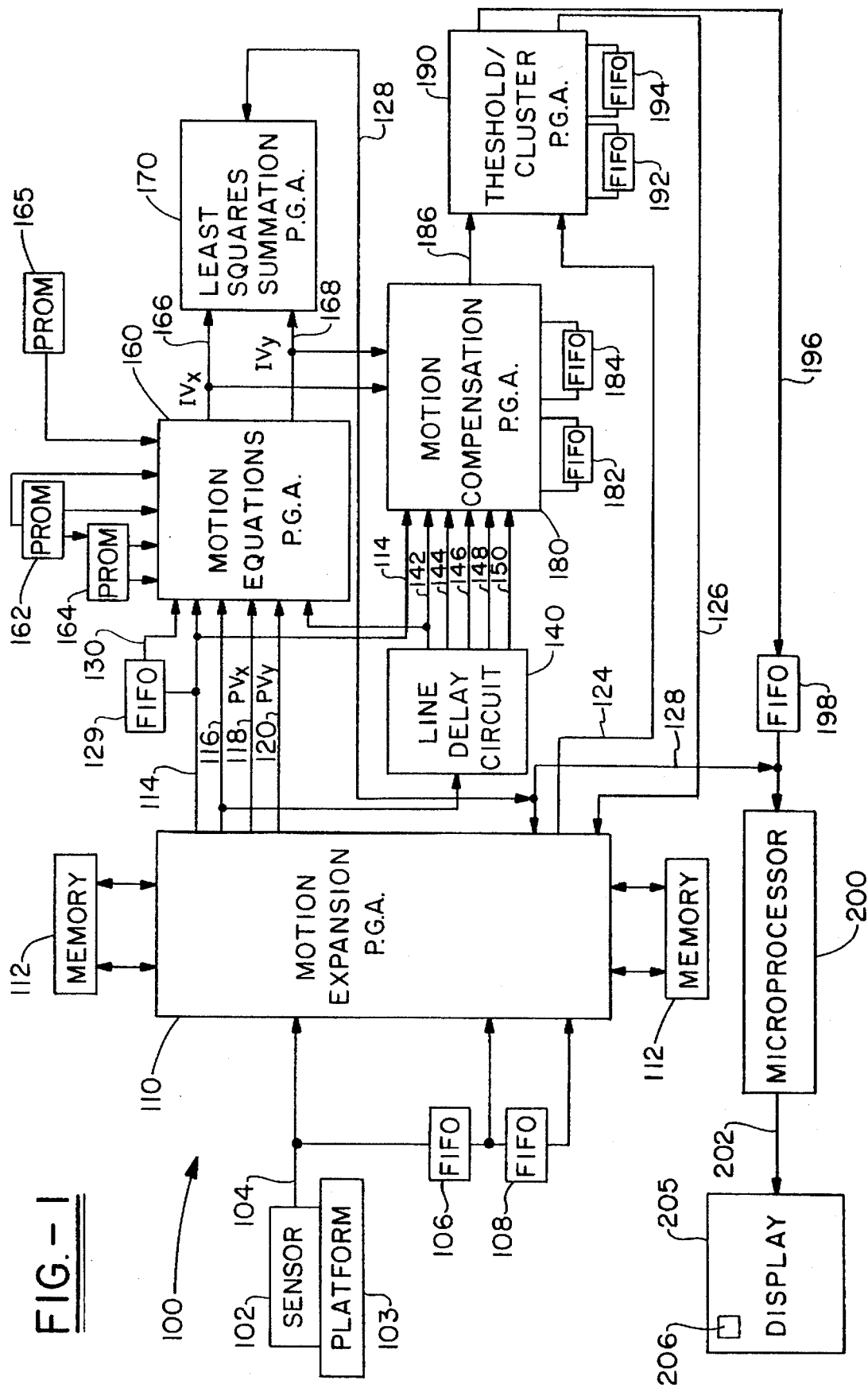
FIG. 1 is a block diagram of an exemplary device in accordance with an embodiment of the present invention for use as an optical flow detection system employing an optical flow technique.

FIG. 1 depicts a device generally indicated by the numeral 100 that is an optical flow detection system that employs an optical flow technique which is a component of an automatic target cuer system (not shown) for tracking multiple moving targets. Device 100 includes a sensor 102 which is carried on a platform 103. It will be appreciated that the sensor 102 is any device capable of detecting motion, whether it be based on visual characteristics such as contrasting light intensity, or based upon heat emissions, acoustic emissions, or the like. The platform 103 can be any type of ship, moving vehicle, aircraft and the like.

Sensor 102 provides a video image signal 104 which is received by a first-in-first-out buffer 106 (hereinafter FIFO), FIFO buffer 108 and a motion expansion programmable gate array 110 (hereinafter PGA). It will be appreciated that memory 112 communicates with the motion expansion PGA 110. As will be described in more detail later herein, the motion expansion PGA 110 and associated circuitry is responsible for generating a velocity value for every pixel of the video signal 104 by solving quadratic equations modeled upon the expected motion of the platform 103 and of the objects tracked by the device 100.

To accomplish this tracking of multiple objects, the motion expansion PGA 110 generates an intensity signal 114, a field delayed intensity signal 116, a predicted pixel velocity in the x direction 118 and a predicted pixel velocity in the y direction 120. The motion expansion PGA 110 also generates a threshold and averaged video signal 124. The motion expansion PGA 110 receives a thresholded surface signal 126 and a bi-directional data bus signal 128. The intensity signal 114 communicates with a FIFO buffer 129 which generates a line delayed intensity signal 130. The field delayed intensity signal 116 is received by a line delay circuit 140.

Those skilled in the art will appreciate that the line delay circuit 140 generates line and field delayed intensity signals 142 through 150 for the purpose of two dimensional motion compensation calculations. The use of the line and field delayed intensity signals will be discussed below.

A motion equations PGA 160 receives the signals 114, 116, 118, 120, 130 and 142 for the purpose of calculating instantaneous two dimensional velocity values at every pixel of the image sequence. To accomplish this task, motion equations PGA 160 generates spatial and temporal intensity gradients and uses these intensity gradients within the constraint of a set of motion equations. To evaluate the motion at each pixel, the intensity gradient data for each pixel is used in conjunction with a velocity estimate for that particular pixel from a previous iteration of the motion equations PGA 160. In other words, the predicted pixel velocity x 118 and the predicted pixel velocity y 120 are employed to evaluate the motion of each pixel. Three programmable read-only memory (hereinafter PROM) devices 162, 164 and 165 are in communication with the motion equations PGA 160. PROM devices 162 and 164 are used along with PGA 160 to calculate the motion equations. Those skilled in the art will appreciate that at system power up, programming information containing the circuit specifications for the device 100 is transferred from PROM 165 to PGA 160 and the remaining PGA's within device 100. By changing the contents of the PROM's 162, 164 and 165, different circuitry can be created for the purpose of modifying the set of motion equations. After the calculations are complete, the motion equations PGA 160 generates an instantaneous velocity in the x direction 166 and an instantaneous velocity in the y direction 168 for each pixel of the image sequence.

A least squares summation PGA 170 receives the instantaneous velocity signals x, y 166 and 168 respectively, and calculates ten different summations for use in predicting the velocity of an arbitrary pixel. The least squares summation PGA 170 communicates the values of the ten summations to the microprocessor 200 across the bi-directional data bus signal 128.

A motion compensation PGA 180 also receives instantaneous velocity signals x and y, 166, 168, respectively. Additionally, the motion compensation PGA 180 receives the intensity signal 114 and the line and field delayed intensity signals 142 through 150. FIFO buffers 182 and 184 are also in communication with the motion compensation PGA 180. FIFO buffers 182 and 184 properly sequences when the line and field delayed intensity signals 142–150 are compared to the instantaneous velocity signals 166, 168. In particular, the motion compensation PGA 180 uses the instantaneous velocity signals x and y, 166 and 168, respectively, from the motion equations PGA 160 to remove background scene motion from a frame of video so potential targets can be compared at the pixel level with a previous frame of video. This is accomplished by subjecting the instantaneous velocity signals 166 and 168 through a low pass filter to remove high frequency extraneous noise and provide a smooth continuous velocity estimate. This filtering provides an estimate of the motion that each pixel has experienced between successive frames of video. The background motion estimate at each pixel is used to remove background motion from the intensity signal 114 through a "warping" process to generate a differenced surface signal 186. The motion compensation PGA 180 derives a warped value by indexing and interpolating the line and field delayed intensity signals 142–150 with the instantaneous velocity signals 166 and 168. Afterwards, the motion compensation PGA 180 subtracts the intensity signal 114 from the warped value to generate the differenced surface signal 186.

A threshold/cluster PGA 190 receives the differenced surface signal 186 and communicates with the motion expansion PGA 110 by virtue of the threshold and averaged signal 124 and outputs a thresholded surface signal 126. The threshold/cluster PGA 190 also communicates with FIFO buffers 192 and 194. An output signal 196 from the threshold cluster PGA 190 communicates a list of detected moving objects to FIFO buffer 198 for storage such that a microprocessor 200 can access the results. It will further be appreciated that the microprocessor 200 is in communication with the data bus signal 128 for the purpose of calculating the coefficients of the quadratic equations and for providing this information to the motion expansion PGA 110. The threshold/cluster PGA 190 examines the differenced surface signal 186 to determine the location of the moving targets on the video image sequence. To accomplish this, each pixel velocity value is subjected to a local mean and standard deviation calculation by use of low pass filters contained within the threshold/cluster PGA 190.

After all the calculations are performed within the microprocessor 200 an enhanced video signal 202 is submitted to a visual display 205 for viewing by the operator of the motion detection device 100. It will be appreciated that an indicator 206 may be employed to visually highlight an object.

Those skilled in the art will appreciate that the programmable gate arrays used in the above described invention allow logic of up to ten thousand gate complexity to be implemented in a one hundred percent programmable device. Taken together, these PGA's are performing over three billion operations per second. It has been found that programmable gate arrays supplied by Xilinx of San Jose, Calif. Model Nos. 3195 and 4010 have been found acceptable for use in the present invention.

It will further be appreciated that by changing the contents of the PROM's 162, 164 and 165 and by re-configuring the circuitry of device 100, various aspects of a pixel's optical flow can be analyzed as required. Although the present embodiments of the invention contemplate employing optical flow to track multiple objects and to stabilize undesired sensor motion, other uses of the present optical flow technique could be realized.

To have a complete understanding of how optical flow techniques are employed in an exemplary circuit, reference is now made to the flow charts of FIGS. 2 through 5. FIG. 2 provides an exemplary operational flow of a device exemplary of the device 100 for stabilizing undesirable sensor motion generally indicated by the numeral 300. Initially, sensor 102, which is carried on a platform 103, generates an image sequence signal 302 which is segmented into an appropriate number of pixels. The image sequence signal 302 is split into a working signal 304 and a base signal 306 so that the base signal 306 can be used for later comparison. The working signal 304 is received by an optical flow estimator 310 for the purpose of removing all unwanted motion in the image sequence 302 due to motion of the sensor 102 and platform 103. Generally, this background scene motion is removed by calculating individual pixel velocities from the image sequence 302 and performing motion compensation techniques thereon. After the optical flow calculations are complete, the optical flow estimator 310 derives predicted pixel velocity values (globally smooth scene velocities) 334 and filtered instantaneous pixel velocity values (locally smooth scene velocities) 358 which are received by a motion filter 370. The motion filter 370 removes all unwanted motion components from the image sequence signal 302 which includes, but is not limited to, background motion and motion attributable to the platform 103 on which the sensor 102 is secured. As such, the motion filter 370 provides a filtered velocity signal 382.

A sensor motion correction circuit 400 receives the filtered velocity signal 382 and the base image sequence signal 306 such that the filtered velocity signal 382 can be incorporated into the original image sequence so as to generate a stabilized and corrected image sequence signal 410 which can be submitted to the visual display 205. It will be appreciated that the corrected image sequence signal 410 provides a stabilized image of what is seen by the sensor 102.

Those skilled in the art will appreciate that the optical flow estimator 310 is only effective if two assumptions are made. First, over a small time interval, the illumination of the observed terrain supplied by the sensor 102 remains constant. Secondly, over the same small time interval, the motion of the sensor 102 is continuous.

The first assumption, yields the following equation basic to optical flow methodology:

$$E_x V_x + E_y V_y + E_t = 0 \tag{1}$$

Where E(x, y, t) is the image intensity at the location (x, y) at the time "t". $E_x$, $E_y$ and $E_t$ correspond to the intensity gradients in the x, y and t directions, respectively. $V_x$(x, y, t) and $V_y$ (x, y, t) are the optical flow velocities of a pixel at (x, y, t) in the x and y directions respectively. These three intensity gradients are used to determine the magnitude and direction of a "change" in an image and are calculated for each pixel based upon an adjacent pixels intensity value enclosed in a 2×2×2 cube of pixels. In other words, to determine the change in intensity of the gradient along the x axis, the first order differences are taken along each parallel edge of the 2×2×2 cube of intensity pixels. This same calculation is repeated for the y and t axes.

It will be appreciated, however, that equation (1) listed above provides only one equation with two unknowns $V_x$ and $V_y$. As such, a constraint is needed for application of the second assumption that the sensor motion is continuous over small time intervals. To this end, a model has been developed wherein the necessary sensor motion continuity constraints are quantified by using a set of quadratic equations to determine the estimated pixel velocity field from a previous image sequence. The form of each quadratic equation is determined based upon the type of sensor motion expected (roll, yaw, pitch, zoom, cross-track translation, along-track translation, etc.). Coefficients for each of these quadratic equations are determined by performing a least squares fitting of the quadratic equations to the instantaneous velocity field provided by the image sequence.

Referring now to FIG. 3, it can be seen that a detailed view of the optical flow estimator 310 and of the motion filter 370 are provided. In particular, the working signal 304 is received by a low pass filter 312 for the purpose of removing unwanted high frequency noise. As such, the working signal 304 is converted to a filtered signal 314. The filtered signal 314 is received by an image queue 318 for the purpose of delaying the filtered signal 314 for later use as delay signal 320. Gradient circuity 322 receives the filtered signal 314 and compares it to the delay signal 320 so as to provide an intensity gradient signal 324 in the x direction, an intensity gradient signal 326 in the y direction and an intensity signal 328 in the time direction. All three of these intensity gradient signals 324, 326, 328 are received by the motion equation circuitry 330.

The motion equations circuitry 330 is employed to generate instantaneous pixel velocities for $V_x$ and $V_y$, represented by signal 332, by using predicted pixel velocities for $V_x$ and $V_y$, represented by signal 334, in conjunction with the intensity gradient signals 324, 326 and 328. The equations utilized for deriving the instantaneous pixel velocities 332 in their x and y components are listed hereinbelow.

$$IV_x^{n+1} = PV_x^n - E_x \cdot \frac{E_x \times PV_x^n + E_y \times PV_y^n + E_t}{E_x^2 + E_y^2 + \alpha^2} \tag{2}$$

$$IV_y^{n+1} = PV_y^n - E_y \cdot \frac{E_x \times PV_x^n + E_y \times PV_y^n + E_t}{E_x^2 + E_y^2 + \alpha^2} \tag{3}$$

$$PV_x = f_x(x, y, A_1, \ldots, A_8) \tag{4}$$

$$PV_y = f_y(x, y, A_1, \ldots, A_8) \tag{5}$$

In the above equations "n" is equivalent to the current iteration of the calculation performed by the device 100. The Greek character alpha is employed as a constant and $A_1, \ldots, A_8$ are the coefficients obtained as the solution to the joint minimization of the quantifies $$\epsilon_x^2 = \Sigma(IV_x^n - PV_x^n)^2 \tag{6}$$

$$\epsilon_y^2 = \Sigma(IV_y^n - PV_y^n)^2 \tag{7}$$

where the summations are performed over the image. Those skilled in the art will appreciate that the motion equations circuitry 330 generates a continually updated value for the instantaneous pixel velocity signal 332.

Once the instantaneous scene velocity signal 332 is derived it is directed into a global velocity smoothing circuit 340 and into a low pass filter 356. The low pass filter 356 removes unwanted hi-frequency noise to generate a filtered instantaneous pixel velocity signal 358, also referred to as a locally smoothed scene velocity. The locally smoothed scene velocity represents pixel velocity values derived from previous pixel movements that have exhibited similar characteristics.

Figure 4:
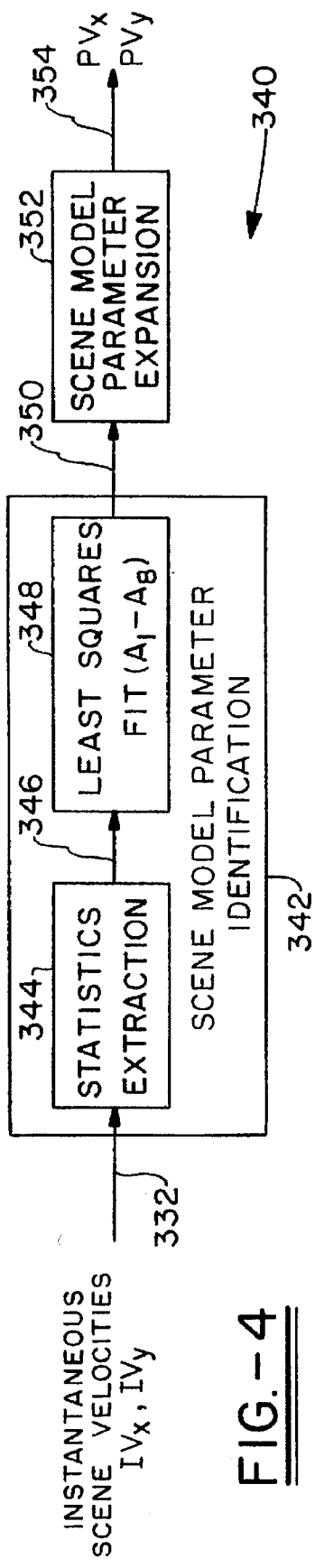
FIG. 4 is a flow chart of the operation of a global velocity smoothing operation of the optical flow estimation procedure.

As best illustrated in FIG. 4, the instantaneous pixel velocity signal 332, also referred to as instantaneous scene velocities, in their x and y components are received by a scene model parameter identification circuit 342 and in particular a statistics extraction circuit 344. The statistics extraction circuitry 344 functions to glean values from the instantaneous pixel velocity signal 332 so as to calculate and derive the coefficients for the global velocity equations employed in the motion equations circuitry 330. The statistics extraction circuitry 344 provides a pixel velocity statistics signal 346 to a least squares fit circuit 348. In the circuit 348, the coefficients ($A_1$–$A_8$) are determined by a least squares fit to previous iterations of the instantaneous pixel velocity signal 332 for the predetermined quadratic equations modeled upon undesired sensor 102 motion. For example, the predetermined quadratic equations, as further developed from equations (4) and (5) and as implemented on motion expansion PGA 110, may be $$PV_x(x,y) = A_1 + A_2 x + A_3 y + A_4 xy + A_5 x^2 \tag{8}$$

$$PV_y(x,y) = A_6 + A_7 x + A_8 y + A_5 xy + A_4 y^2 \tag{9}$$

which are then fitted to the instantaneous velocity fields ($IV_x$, $IV_y$). The fitting process, implemented on the least squares PGA 170 and the microprocessor 200, determines the values for the coefficients $A_1$–$A_8$ for the above equations by minimizing the least squares error between the instantaneous velocity fields and the predicted velocity fields. As is well known in the least squares fitting process, the instantaneous velocity fields may be used to calculate the following ten summations: $\Sigma IV_x$, $\Sigma x^*IV_x$, $\Sigma y^*IV_x$, $\Sigma x^{2*}IV_y$, $\Sigma IV_y$, $\Sigma x^*IV_y$, $\Sigma y^*IV_y$, $\Sigma y^{2*}IV_y$, $\Sigma x^*y^*IV_x$, $\Sigma x^*y^*IV_y$. These summations are then multiplied by a matrix or constants to generate the coefficients $A_1$–$A_8$. The values in the matrix of constants are predetermined and based upon the horizontal and vertical position and size or the area in the instantaneous velocity field that was sampled to determine the ten summations. As a result, the least squares fit circuit 348 generates a pixel velocity coefficient signal 350 which is received by a scene model parameter expansion circuit 352. The scene model expansion circuit 352 employs the derived coefficients in the predetermined quadratic equations so as to generate the predicted pixel velocity signal 334, also known as a globally smoothed signal, in their x and y components for use in the motion equations circuit 330. It will be appreciated that the global velocity smoothing circuit 340 generates a pixel velocity estimate for each and every pixel of the pixel array. In other words, a pixel is "globally smoothed" when a velocity value is generated for the pixel based upon the predetermined quadratic equations. These globally smoothed pixel velocity values represent pixel velocity values derived from coefficients determined by the motion of each and every pixel within the pixel array.

Referring back to FIG. 2, it can be seen that the predicted pixel velocity signal 334 and the filtered instantaneous pixel velocity signal 358 are received by a motion filter 370. As best seen in FIG. 3, motion filter 370 individually receives the predicted pixel velocity signal 334 into a specific motion rejection filter 372. The filter 372 analyzes the predicted pixel velocities and rejects those unwanted velocities attributed to sensor motion such as roll, pitch, yaw, along-track translation and cross-track translation. The specific motion rejection filter 372 then provides a filtered predicted pixel velocity signal 374 to a velocity accumulator 380. Also received by the velocity accumulator 380 is the filtered instantaneous pixel velocity signal 358. Those skilled in the art will appreciate that the velocity accumulator 380 provides a combined filtered pixel velocity output signal 382. This combined filtered output signal 382 is then routed through a time constant 384 so as to provide a delayed accumulated pixel velocity signal 386 that is redirected into the velocity accumulator 380. As such, the velocity accumulator sums the filtered instantaneous pixel velocity signal 358, the filtered predicted pixel velocity signal 374 and a delayed accumulated pixel velocity signal 386 to remove all unwanted motion components from the original image sequence signal 302. With the proper selection of the time constant 384, all background scene motion can be removed from the image sequence. Those skilled in the art will also appreciate that the velocity accumulator 380 is in communication with reset logic circuitry 390. The reset logic circuitry 390 provides a plurality of reset signals 392 to the velocity accumulator 380.

Depending upon the location of the platform 103 it is possible to set the reset logic circuitry 390 to remove various unwanted sensor motions. For example, if the sensor 102 is stationary (stating at the same scene) then all background motions in the scene are due to disturbances and should be removed. These disturbances could be due to vibration, swaying of the platform, such as the rocking of a boat or inadvertent jostling by the operator of the device. It is also possible to cancel background motion using a reset which is triggered at equal periods of time. This method cancels all background motion intermittently, therefore producing a series of step stares. Step starring can make it easier to visually detect moving targets by momentarily cancelling background sensor motion. In other words, at predetermined time intervals the background scene motion is removed and only the moving targets within the imaging sequence are displayed on the visual display. Another type of motion cancellation can be employed based upon individual pixel velocity. For example, if the sensor is subjected to a back and forth yaw step stare operation, the imagery can be stabilized at each extreme of the back and forth movement. As such, removal of the background motion enhances the detection of moving objects within the field of view.

It is also possible to remove unwanted rolling motion while not affecting other movements within the scene such as panning or forward translation. As a sensor undergoes a translational movement, the scene can experience an unwanted rolling motion. By removing the unwanted rolling motion, the target cuer can maintain an accurate fix on the desired target. It is also possible to remove unwanted motion at some location within a displayed image. In other words, a portion of an image can be brought to the center of the display and stabilized at this position so that it stays at the center despite the actual motion of the raw image. This is especially useful when an operator must maintain concentration on one area of a scene. It will be appreciated, that all of these resets are adjustable to provide the desired image sequence display.

Returning now to FIG. 2, the output of the motion filter 370 is provided by the combined filtered pixel velocity signal 382. A sensor motion correction circuit 400 receives the combined filtered pixel velocity signal 382 and the original imaging sequence signal 302 for processing. The circuit 400 thus allows the original image sequence to be stabilized with the filtered pixel velocity signal 382 wherein the moving objects are distinguishable from camouflaged areas, high clutter areas and background scene motion. As such, the sensor motion correction circuitry 400 provides an enhanced imaging sequence signal 410 represented by a plurality of enhanced pixels, which is then transmitted to the display 205 so as to provide a visual representation of the enhanced imaging sequence. Thus, it will be appreciated that the optical flow estimator 3 10 removes selected undesirable motion attributed to the expected motion of the platform 103 which carries the sensor 102.

Figure 5:
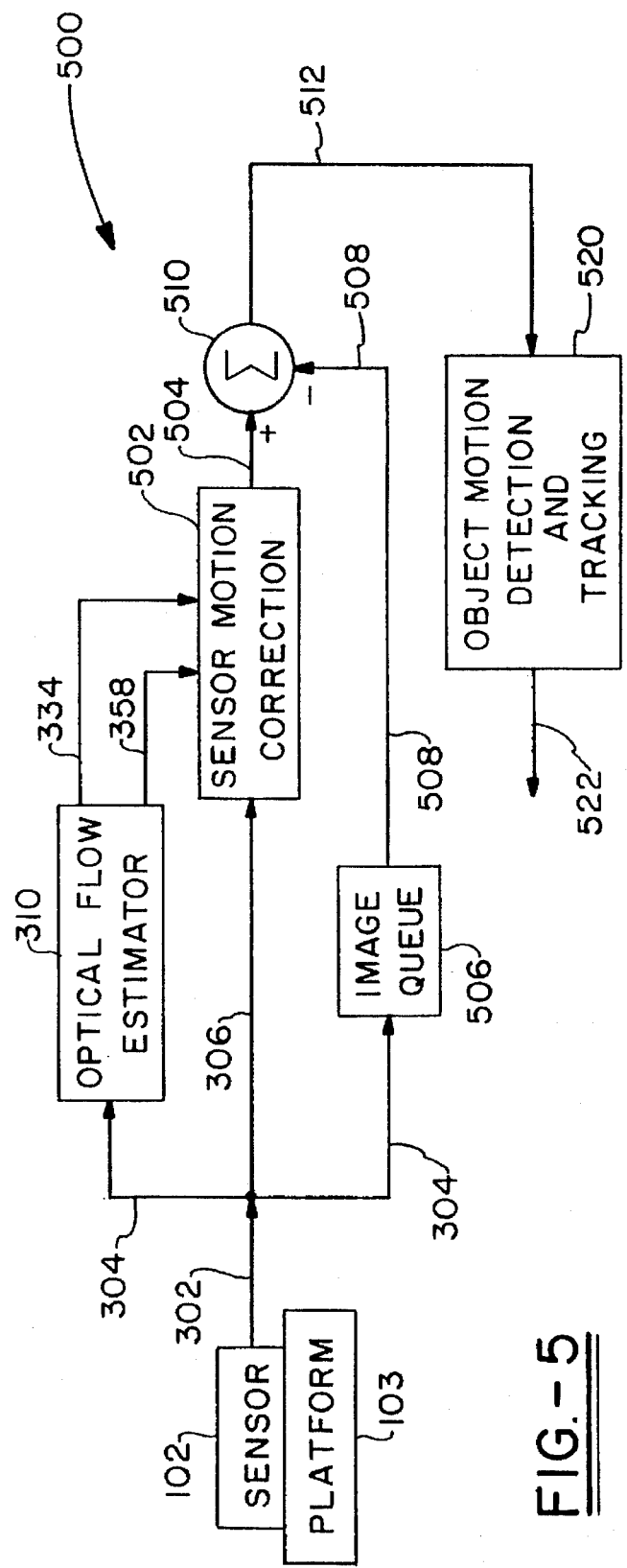
FIG. 5 is a flow chart of the operation of an embodiment of the present invention employing an optical flow technique for detecting a moving object.

Referring now to FIG. 5, a general overview of the operational flow of the device 100 for tracking multiple objects is generally indicated by the numeral 500. Those skilled in the art will appreciate that operational flow 500 employs the same optical flow methodology as described above and as shown in FIGS. 3 and 4.

In particular, the sensor 102 generates an image sequence signal 302 which is segmented into an appropriate number of pixels. The image sequence signal 302 is split into a working signal 304 and a base signal 306 so that the base signal 306 can be used for later comparison. The working signal 304 is received by an optical flow estimator 310 for the purpose of removing all motion in the image sequence 302 due to motion of the sensor 102. As discussed earlier, this background scene motion is removed by calculating individual pixel velocities from the image sequence 302 and performing motion compensation techniques thereon. As discussed in the details of FIGS. 3 and 4 above, the optical flow estimator 310 generates globally smooth scene velocities 334 and locally smooth scene velocities 358 so that they may be received by a sensor motion correction circuit 502. It will also be appreciated that the base signal 306 is also received by the sensor motion correction circuit 502.

The sensor motion correction circuit 502 receives the globally smooth scene velocities 334 and locally smooth scene velocities 358 and the base signal 306 such that a corrected image sequence signal 504 can be generated for later comparison.

It will be appreciated that the working signal 304 is also received by an image queue 506. The working signal 304 is received by the image queue 506 for the purpose of delaying the working signal for later use as a delay signal 508.

A subtractor 510 receives both the corrected image sequence signal 504 and the delay signal 508 for the purpose of subtracting the delay signal 508 from the corrected image sequence signal 504 so as to remove all irrelevant background motion of the video image. As a result, the subtractor 510 generates a moving pixel signal 512 which represents all pixels moving with respect to the background scene. These moving pixels or "bright spots" represent potential targets for the automatic cuer system.

The moving pixel signal 512 is then received by an object motion detection and tracking circuit 520. The circuit 520 filters the moving pixel signal 512 to determine if a potential moving object should be classified as a target for the cuer. The filtering of circuit 520 removes any extraneous noise and requires that the potential moving target be present in at least five fields of video. Additionally, the circuit 520 clusters or combines any pixels that are adjacent to or within one pixel of each other and classify those pixels as a potential target. As such, the circuit 520 generates a tracking signal 522 for use by the targeting cuer. It will be appreciated by those skilled in the art that the circuit 520 functions to drop out any potentially inconsistent frames in the video image.

Therefore, by employing the optical flow estimator 310 in the operational flow 500 of an exemplary device 100, it is possible to track multiple moving targets that are camouflaged, small or have a low signal to noise ratio. As such, any object within a video display that is moving at a rate of speed different than the remaining objects within a video display are easily identifiable. It will be appreciated that in this embodiment, the circuit 348 employs coefficients ($A_1$–$A_8$) determined by a least squares fit to previous iterations of the instantaneous pixel velocity signal 332 for the predetermined quadratic equations modeled upon the expected curvilinear motion of the targets.

Therefore, it should be apparent from the description of the above embodiments that the optical flow technique utilizes instantaneous pixel velocity data for the purpose of calculating a plurality of coefficients employed in a set of quadratic equations. The quadratic equations generate an output so that pixels of a video display can be enhanced to provide improved scene stabilization and to provide improved target tracking capabilities.

Those skilled in the art will appreciate that the optical flow estimation circuitry 310 requires that five frames of video or iterations be provided before confirmation that an irregular pixel motion is related to a moving target. As such, the device 100 is able to compensate for pixel motion to an accuracy of $1/32$ of a pixel and is able to achieve this accuracy within $1/12$th of a second within five fields.

Thus, it can be seen that the objects of the invention have been satisfied by the structure presented above. It should be apparent to those skilled in the art that the objects of the present invention could be practiced with any type of visual, heat sensing or other similar type sensor securably attached to any type platform, such as a ship, vehicle, aircraft or other like structure. While the preferred embodiment of the invention have been presented and described in detail, it will be understood that the invention is not limited thereto or thereby. Accordingly, for an appreciation of the true scope and breadth of the invention, reference should be made to the following claims.

What is claimed is:

1. An optical flow detection system for receiving a plurality of pixels so as to derive an instantaneous pixel velocity value and a predicted pixel velocity value for each pixel, comprising:

sensor means for supplying an imaging sequence which includes potential targets represented by at least one pixel;

an image queue for storing said imaging sequence;

gradient means for receiving and comparing said imaging sequence to said stored imaging sequence so as to generate a pixel intensity gradient value for each of said pixels;

calculation means for receiving said pixel intensity gradient values and a predicted pixel velocity value so as to generate an instantaneous pixel velocity value for each pixel; and smoothing means for receiving said instantaneous pixel velocity values which are employed in a least squares fitting to generate coefficients which are used in a set of quadratic equations to generate said predicted pixel velocity values.

2. The optical flow detection system according to claim 1, wherein said smoothing means further comprises:

extraction means for receiving said instantaneous pixel velocity values and dearriving therefrom a plurality of pixel velocity statistics;

fitting means for receiving said plurality of pixel velocity statistics and performing a least squares fitting of said pixel velocity statistics to said instantaneous pixel velocity value so as to generate a plurality of pixel velocity coefficients; and expansion means for employing said pixel velocity coefficients in a set of quadratic equations so as to generate said predicted pixel velocity value for each pixel.

3. The optical flow detection system according to claim 2, wherein said set of quadratic equations is modeled upon said sensor means' expected motion.

4. The optical flow detection system according to claim 3, further comprising:

filtering means for receiving said instantaneous and predicted pixel velocity values so as to generate a combined filtered pixel velocity value;

correction means for receiving said combined filtered pixel velocity value and said imaging sequence so as to generate a stabilized imaging sequence; and display means for providing a visual display of said stabilized imaging sequence wherein the optical flow detection system removes selected undesirable motion of said sensor means.

5. The optical flow detection system according to claim 4, wherein said filtering means further comprises:

a motion rejection filter for receiving said predicted pixel velocity values and removing those pixel velocity values attributable to motion of said sensor means so as to generate a filtered predicted pixel velocity;

accumulator means for receiving said filtered predicted pixel velocity, said instantaneous pixel velocity, and a delayed accumulated pixel velocity value so as to generate said combined filtered pixel velocity value, wherein said combined filtered pixel value is received by a time constant, said time constant generating said delayed accumulated pixel velocity value.

6. The optical flow detection system according to claim 5, wherein said accumulator means receives a plurality of selectively employed reset signals to remove undesirable background motion contained within said combined filtered pixel velocity value.

7. The motion detection system according to claim 2, wherein said set of quadratic equations is modeled upon background pixel motion within said imaging sequence, wherein background pixel motion includes expected curvilinear motion.

8. The optical flow detection system according to claim 7, further comprising:

a second image queue for storing said imaging sequence;

correction means for receiving said instantaneous and said predicted pixel velocity values and said imaging sequence so as to generate a corrected image sequence signal;

a subtractor for subtracting said stored imaging sequence from said corrected image sequence signal so as to generate a moving pixel signal; and an object motion detection and tracking circuit for receiving said moving pixel signal so as to generate a tracking signal which clusters and confirms said moving pixel signal as potential targets wherein the optical flow detection system identifies pixels moving with respect to a background scene contained within said imaging sequence.

9. A method for estimating the optical flow of a plurality of pixels by employing a set of quadratic equations to generate a plurality of instantaneous pixel velocity values and a plurality of predicted pixel velocity values for each pixel, comprising the steps of:

providing a sensor to supply a real-time imaging sequence represented by a plurality of pixels;

storing said imaging sequence in an image queue;

comparing said stored imaging sequence to said imaging sequence so as to generate an intensity gradient value for each of said pixels;

calculating an instantaneous pixel velocity value for each pixel derived from said pixel intensity gradient values and a predicted pixel velocity value by employing a set of quadratic equations;

extracting a plurality of pixel velocity statistics from said instantaneous pixel velocity values;

using said pixel velocity statistics by a least squares fitting of said pixel velocity statistics to said instantaneous pixel velocity values so as to generate a plurality of pixel velocity coefficients; and providing said pixel velocity coefficients in said set of quadratic equations to generate said predicted pixel velocity values for each pixel.

10. The method according to claim 9, further including the step of:

modelling said set of quadratic equations upon said sensor means' expected motion so as to remove selected undesirable sensor motion.

11. A method according to claim 10, further including the steps of:

filtering said instantaneous pixel velocity values and said predicted pixel velocity values so as to generate a combined filtered pixel velocity value for each pixel;

correcting said combined filtered pixel velocity values by combining therewith said imaging sequence so as to generate a stabilized imaging sequence represented by a plurality of stabilized pixels; and displaying visually said plurality of stabilized pixels.

12. The method, as set forth in claim 11, wherein said step of filtering includes the steps of:

providing a motion rejection filter for receiving said predicted pixel velocity value for each pixel;

removing those pixel velocity values attributable to motion of said sensor means so as to provide a filtered predicted pixel velocity value for each pixel; and accumulating said filtered predicted pixel velocity value, said instantaneous pixel velocity value and a delayed accumulated pixel velocity value so as to provide a combined filtered pixel velocity value.

13. The method as set forth in claim 12, further including the step of directing said combined filtered pixel velocity value through a time constant so as to provide said delayed accumulated pixel velocity.

14. The method as set forth in claim 13, wherein said step of accumulating includes the step of receiving a plurality of selectively employed reset signals to remove undesirable background motion contained within said combined filtered pixel velocity value.

15. The method according to claim 9, further including the step of:

modelling said set of quadratic equations upon background pixel motion within said imaging sequencer wherein background pixel motion includes expected curvilinear motion.

16. The method according to claim 15, further including the steps of:

storing said imaging sequence in a second image queue;

correcting said instantaneous and said predicted pixel velocity values and said imaging sequence so as to generate a corrected image sequence signal;

subtracting said stored imaging sequence from said corrected image sequence signal so as to generate a moving pixel signal; and detecting and tracking said moving pixel signal so as to generate a tracking signal which clusters and confirms said moving pixel signal as potential targets.

17. A method for estimating the optical flow of a plurality of pixels contained within a video-based imaging sequence, comprising the steps of:

providing a sensor carried on a platform to supply a real-time imaging sequence represented by a plurality of pixels and storing said imaging sequence in an image queue;

generating directional intensity values for each of said pixels by comparing said stored imaging sequence to said imaging sequence;

employing a set of quadratic equations to calculate an instantaneous pixel velocity value for each pixel by using said directional intensity values and a plurality of predicted pixel velocity values;

extracting a plurality of pixel velocity statistics from said instantaneous pixel velocity values;

generating a plurality of pixel velocity coefficients by a least squares fit to previous iterations of said instantaneous pixel velocity values; and generating said plurality of predicted pixel velocity values for each pixel by employing said plurality of pixel velocity coefficients in said set of quadratic equations.

18. The method according to claim 17, further including the step of:

modelling said set of quadratic equations upon said sensor's expected motion wherein estimating the optical flow of said plurality of pixels contained within a video-based imaging sequence allows the removal of selected undesirable sensor motion.

19. The method according to claim 18, further including the step of:

modelling said set of quadratic equations upon background pixel motion within said imaging sequence wherein the optical flow detection system identifies pixels moving with respect to a background scene contained within said imaging sequence.

* * * * *